(12) United States Patent
Hirayama

(10) Patent No.: US 10,300,879 B2
(45) Date of Patent: May 28, 2019

(54) SIDE CURTAIN AIRBAG SYSTEM

(71) Applicant: HONDA MOTOR CO., LTD., Tokyo (JP)

(72) Inventor: Hiroyuki Hirayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/647,528

(22) Filed: Jul. 12, 2017

(65) Prior Publication Data

US 2018/0015900 A1    Jan. 18, 2018

(30) Foreign Application Priority Data

Jul. 14, 2016 (JP) .................. 2016-139748

(51) Int. Cl.
| | |
|---|---|
| B60R 21/213 | (2011.01) |
| B60R 21/217 | (2011.01) |
| B60R 21/232 | (2011.01) |
| B60R 21/16 | (2006.01) |

(52) U.S. Cl.
CPC .......... *B60R 21/213* (2013.01); *B60R 21/217* (2013.01); *B60R 21/2171* (2013.01); *B60R 21/232* (2013.01); *B60R 2021/161* (2013.01)

(58) Field of Classification Search
CPC ... B60R 21/213; B60R 21/217; B60R 21/232; B60R 2021/161
See application file for complete search history.

(56) References Cited

U.S. PATENT DOCUMENTS

| | | | |
|---|---|---|---|
| 7,905,511 B2* | 3/2011 | Okimoto | 280/728.2 |
| 8,833,797 B2* | 9/2014 | Suga | B60R 13/0206 |
| | | | 280/728.2 |

(Continued)

FOREIGN PATENT DOCUMENTS

| | | |
|---|---|---|
| CN | 101402344 | 4/2009 |
| JP | 3849563 B2 | 11/2006 |

(Continued)

OTHER PUBLICATIONS

Tetsuya Ogino, Curtain Air Bar System, Oct. 1, 2015, EPO, WO 2015/146361 A1, Machine Translation of Description (Year: 2015).*

(Continued)

*Primary Examiner* — James A English
(74) *Attorney, Agent, or Firm* — Westerman, Hattori, Daniels & Adrian, LLP

(57) ABSTRACT

A side curtain airbag system 10 includes: an airbag body 21 mounted on a vehicle interior side of a roof side part of a body and deploying upon supply of gas; and a protector 22 designed to hold the airbag body 21 and guide deployment of the airbag body 21. The protector 22 includes: a main body part 41 extending along the roof side part and covers the airbag body 21; multiple first ribs extending toward a vehicle exterior from the main body part 41, capable of making contact with the body at the time of deployment of the airbag body 21, and arranged in a direction in which the main body part 41 extends; and a second rib 43 connecting an adjacent pair, of the first ribs 42 to each other, and extending toward the vehicle exterior and obliquely downward from the main body part 41.

4 Claims, 6 Drawing Sheets

(56) References Cited

U.S. PATENT DOCUMENTS

| | | | |
|---|---|---|---|
| 8,936,270 B2* | 1/2015 | Kurahashi | B60R 21/23138 |
| | | | 280/728.2 |
| 9,573,550 B1* | 2/2017 | Mitchell | B60R 21/213 |
| 2009/0091102 A1* | 4/2009 | Okimoto | 280/728.2 |
| 2009/0091105 A1* | 4/2009 | Okimoto | B60R 21/213 |
| | | | 280/728.3 |
| 2012/0267879 A1* | 10/2012 | Kim | B60R 21/213 |
| | | | 280/730.2 |
| 2016/0311390 A1* | 10/2016 | Tsumura | B60R 21/213 |

FOREIGN PATENT DOCUMENTS

| | | |
|---|---|---|
| JP | 2009-90709 A | 4/2009 |
| JP | 2015-30367 A | 2/2015 |
| WO | 2015/146361 A1 | 10/2015 |

OTHER PUBLICATIONS

Tetsuya Ogino, Curtain Air Bar System, Oct. 1, 2015, EPO, WO 2015/146361 A1, English Abstract (Year: 2015).*

Notification of Reasons for Refusal dated Apr. 3, 2018, issued in counterpart Japanese application No. 2016-139748, with English translation. (13 pages).

Office Action dated Dec. 29, 2018, issued in counterpart CN Application No. 201710510131.8, with English translation. (12 pages).

* cited by examiner

SIDE CURTAIN AIRBAG SYSTEM

CROSS-REFERENCE OF RELATED APPLICATION

This application claims priority of Japanese Patent Application No. 2016-139748 filed in Japan on Jul. 14, 2016, the entire contents of which are incorporated herein by reference.

TECHNICAL FIELD

The present invention relates to a side curtain airbag system.

BACKGROUND OF THE INVENTION

In some cases, a side curtain airbag system that protects an occupant upon input of an impact at the time of side collision or roll-over of a vehicle is installed on a roof side part of the vehicle. For example, Japanese Patent No. 3849563 describes a side curtain airbag system that is stored between a head lining and an inner panel, and can deploy from an upper side part of the vehicle so as to cover the entire side faces of a vehicle compartment.

SUMMARY OF INVENTION

Meanwhile, such a side curtain airbag system sometimes has a protector that holds an airbag body while it is not in use. The protector is designed to hold the airbag body that extends along the roof side part and is folded into a long shape, and guide the airbag body that deploys like a curtain upon input of an impact. The protector covers the airbag body from the outer side in the vehicle widthwise direction and above and opens downward, which makes the airbag body deploy so as to cover the side faces of the vehicle compartment.

In this respect, in order to make the airbag deploy in a desired direction at the time of deployment of the airbag body, it is necessary to inhibit the protector from being elastically deformed due to the deployment pressure of the airbag body. The protector also needs to have occupant protection capability, e.g., a configuration capable of absorbing an impact applied when an occupant makes contact with the protector.

Against this background, the present invention provides a side curtain airbag system that enables the stabilization of the deployment direction of an airbag body and the protection of an occupant at the same time.

A side curtain airbag system according to the present invention (an airbag system 10 of an embodiment of the present invention, for example) includes: an airbag body (an airbag body 21 of the embodiment, for example) that is mounted on a vehicle interior side of a roof side part (a roof side part of the embodiment, for example) of a vehicle body (a vehicle body 2 of the embodiment, for example) and deploys upon supply of gas; and a protector (a protector 22 of the embodiment, for example) that is designed to hold the airbag body and guide deployment of the airbag body. In the system, the protector includes: a main body part (a main body part 41, of the embodiment, for example) that extends along the roof side part and covers the airbag body; multiple first ribs (first ribs 42 of the embodiment, for example) that extend toward a vehicle exterior from the train body part and capable of making contact with the vehicle body at the time of deployment of the airbag body, and that are arranged in a direction in which the main body part extends; and a second rib (a second rib 43 of the embodiment, for example) that connects an adjacent pair of the first ribs to each other, and extends toward the vehicle exterior and obliquely downward from the main body part.

According to the present invention, since the paired first ribs 42 adjacent to each other are connected by the second rib, the rigidity of the first ribs can be increased. This inhibits the first ribs from being elastically deformed and allows the first ribs to stay in contact wits the vehicle body at the time of deployment of the airbag body, thus making it possible to inhibit the main body part of the protector covering the airbag body from being deformed. Thereby, the deployment direction of the airbag body can be stabilized.

In addition, the second rib extends toward the vehicle exterior and obliquely downward from the main body part mounted on the roof side part. Thus, when an occupant makes contact with the protector from the vehicle interior-side and below, the second rib is applied with a load in a direction normal to the principal face of the second rib. Thereby, the second rib can be bent easily. Moreover, since the first ribs are also applied with the load in the direction normal to the principal face of the second rib, the first ribs are not supported by the second rib and thus can be deformed easily. Thereby, an impact applied when an occupant makes contact with the protector can be absorbed.

These enable the stabilization of the deployment direction of the airbag body and the protection of an occupant at the same time.

In the above side curtain airbag system, it is preferable that the second rib has a notch (cutout) part (a notch part 48 of the embodiment, for example) that is located at the center of the second rib in the direction in which the main body part extends, and formed by notching (cutting out) a vehicle exterior-side portion of the second rib.

According to the present invention, the second rib has the notch part that is located at the center of the second rib in a direction same as the direction in which the multiple first ribs are arranged. This implements a structure which enables the second rib to be easily bent with the help of the notch part while achieving an increase of the rigidity of the first ribs with the help of the second rib. This enables the stabilization of the deployment direction of the airbag body and the protection of an occupant at the same time.

In the above side curtain airbag system, it is preferable that the second rib is placed at a position corresponding to an occupant's seating position.

According to the present invention, it is possible to inhibit the main body part from being deformed at the occupant's seating position and deploy the airbag body in a desired direction.

In the above side curtain airbag system, it is preferable that the second rib is placed at a position closer to the vehicle exterior-side than a vehicle interior-side end part of each of the first ribs.

According to the present invention, a connection part between each of the first ribs and the second rib is placed at a position closer to the vehicle exterior-side than the vehicle interior-side end part of the first rib. This makes it possible to deform the whole of the first rib around the connection part between itself and the second rib when an occupant makes contact with the vehicle interior-side end part of the first rib. Thereby, an impact applied when an occupant makes contact with the protector can be absorbed by the whole of the first rib.

In the above side curtain airbag system, it is preferable that each of the first ribs has a protruding part (a protruding part 47 of the embodiment, for example) that protrudes toward an interior lining member (a roof lining 7 of the embodiment, for example) so as to be capable of making contact with the interior lining member.

According to the present invention, the interior lining member comes into contact with the protruding part when it moves toward the side curtain airbag system, whereby misalignment of the interior lining member can be prevented easily.

Effect of the Invention

The side curtain airbag system according to the present invention enables the stabilization of the deployment direction of an airbag body and the protection of an occupant at the same time.

DETAILED DESCRIPTION OF THE INVENTION

Hereinbelow, an embodiment of the present invention is described with reference to FIGS. 1 to 6. Throughout the following description, directional terms such as "front", "rear", "up", "down", "left", and "right" are the same as those directions in relation to a vehicle unless otherwise noted. In addition, throughout the drawings, the arrow UP indicates the upside, the arrow FR indicates the front, and the arrow RI indicates the vehicle interior side in the vehicle widthwise direction. Note that, since side curtain airbag systems according to this embodiment. (hereinafter simply referred to as the airbag system) located on both sides of the vehicle in the vehicle widthwise direction have the same configuration, only the left airbag system is described in the following description.

Figure 1:
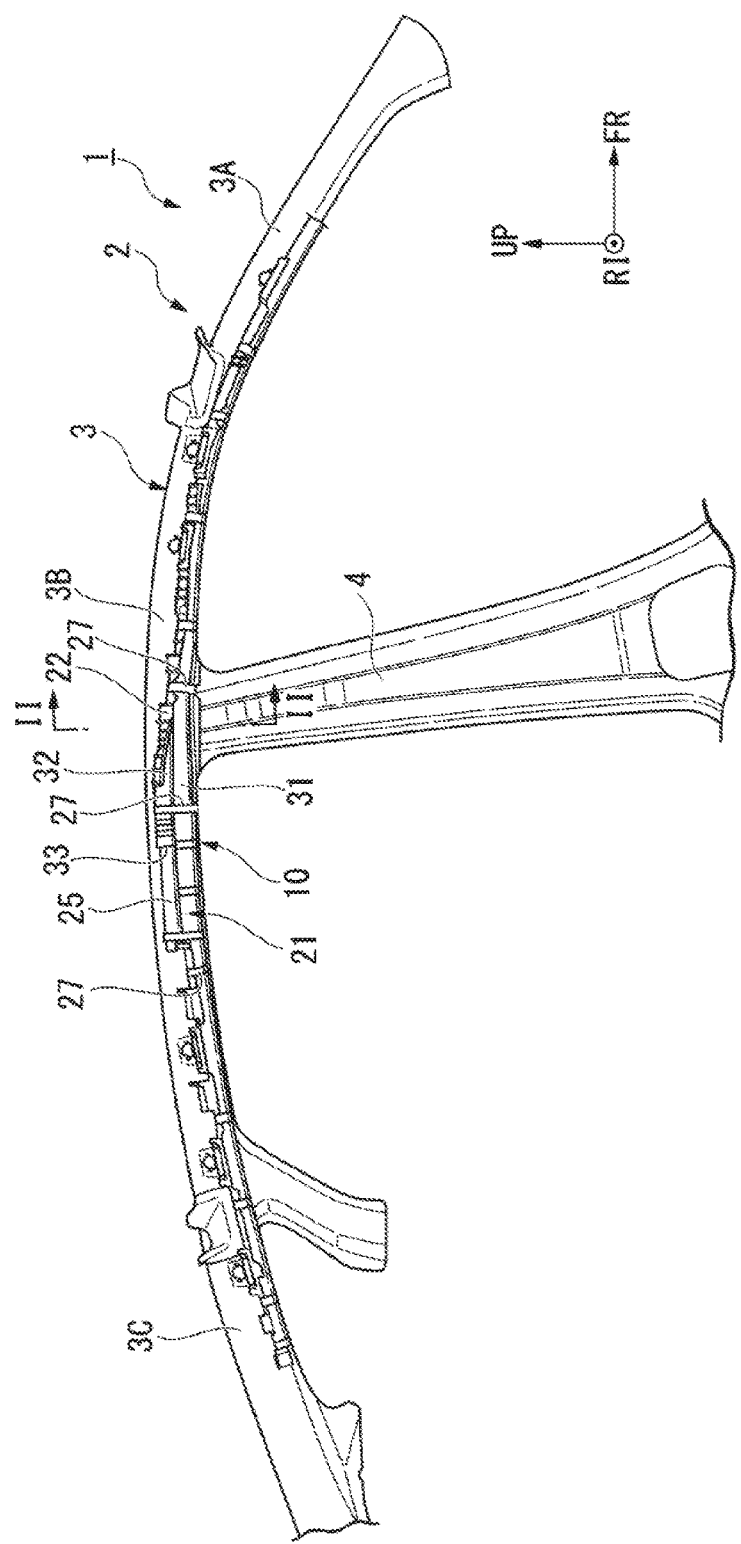
FIG. 1 is a side view illustrating, as seen from the vehicle interior, a side curtain airbag system placed on the left side of a vehicle.
Figure 2:
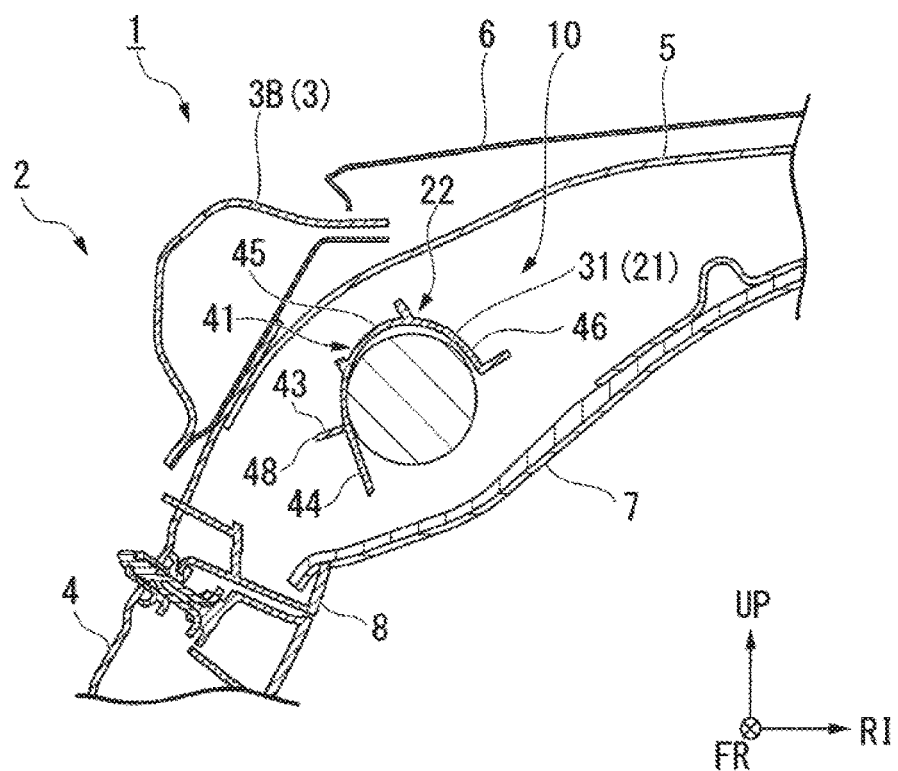
FIG. 2 is an explanatory view of the vehicle, and is a sectional view of a portion of FIG. 1 taken along the line II-II thereof.

FIG. 1 is a side view illustrating, as seen from the vehicle interior, the airbag system placed on the left side of the vehicle, FIG. 2 is an explanatory view of the vehicle, and is a sectional view of a portion of FIG. 1 taken along the line II-II thereof.

As illustrated in FIG. 1, a body 2 on the left side of a vehicle 1 includes: a roof side part 3 that is composed of a front pillar 3A, a roof side rail 3B, and a rear pillar 3C arranged continuously from the front side to the rear side; and a center pillar 4 that is joined to the vicinity of the center of the roof side rail 33 in the front-rear direction and extends downward. In addition, as illustrated in FIG. 2, the body 2 includes a roof arch 5 that is placed between the left and right roof side rails 3B. Both left and right end parts of the roof arch 5 are respectively joined to joints between the left and right roof side rails 3B and center pillars 4.

A roof panel 6 that covers the body 2 from above and a roof lining 7 (interior lining member) that covers the body 2 from below to form the ceiling of a vehicle compartment are arranged between the left and right roof side rails 3B (only the left roof side rail 3B is illustrated). In addition, a garnish. 8 that covers the center pillar 4 from the vehicle interior is placed at the vehicle interior side of the center pillar 4. The roof lining 7 is locked on an upper end part of the garnish 8 from above.

An airbag system 10 is disposed at the vehicle interior side of the roof side part 3 of the vehicle body 2 along the roof side part 3 while being covered with the roof lining 7 from the vehicle interior. As illustrated in FIG. 1, the airbag system 10 mainly includes: an airbag body 21; a protector 22; and an inflator 25. Upon collision of the vehicle 1, the airbag system 10 inflates the airbag body 21 using gas fed from the inflator 25 and deploys the airbag body 21 along a side inner face of the vehicle compartment like a curtain.

The airbag body 21 is formed in the shape of a bag by sewing together the entire outer circumferential portions of base fabrics laid one on top of the other. Alternatively, the airbag body 21 is formed by a method of weaving a part of the airbag body to be inflated like a bag and the other part at the same time out of a single fabric. The airbag body 21 includes a deployment part 31 that can be deployed like a curtain; and a gas introduction route 32 that allows gas fed from the inflator 25 to circulate toward the inside of the deployment part 31.

The deployment part 31 is formed to deploy in the shape of a rectangle whose longitudinal direction is the front-rear direction as seen in the vehicle widthwise direction.

The gas introduction route 32 protrudes upward from an upper edge part and a central part in the front-rear direction of the deployment part 31. A gas inlet 33 for letting gas flow into the airbag body 21 is formed in a tip part of the gas introduction route 32.

The airbag body 21 is disposed along the roof side part 3 with the deployment part 31 folded, and is mounted on the roof side part 3 while being fixed thereto at multiple positions. In the state where the deployment part 31 is folded, the airbag body 21 has a long shape extending in the front-rear direction. Here, the method of folding the deployment part 31, including folding it in a zigzag and in a roll, may be changed as appropriate.

The inflator 25 is formed in a cylindrical shape, and is mounted on a substantially central portion of the roof side rail 3B in the front-rear direction so as to extend in the front-rear direction. The inflator 25 is disposed on an upper part of the deployment part 31 of the airbag body 21, and its gas supply port (not illustrated) is connected to the gas inlet 33 of the airbag body 21.

Figure 3:
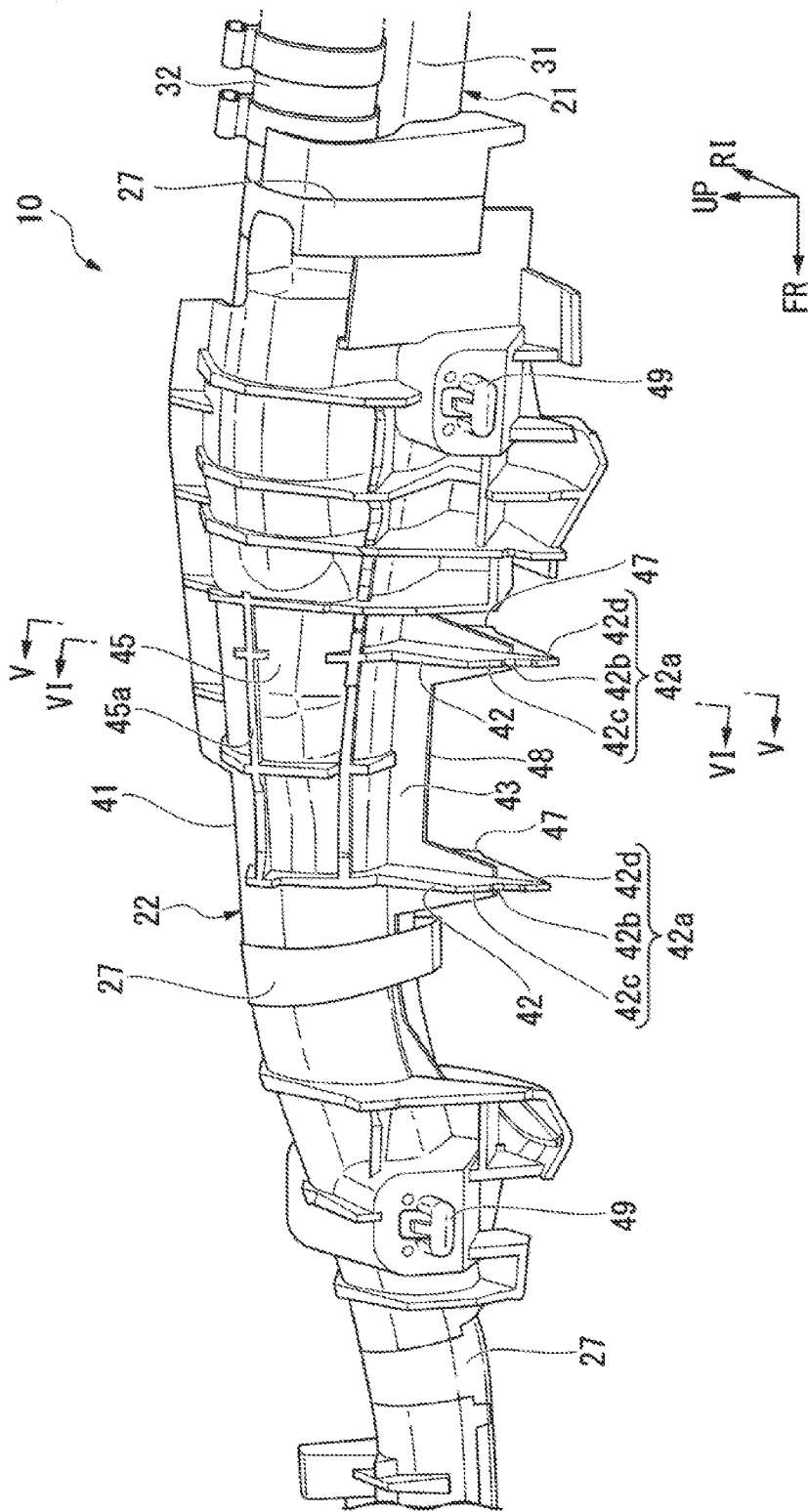
FIG. 3 is a perspective view of the side curtain airbag system as seen from the vehicle exterior.
Figure 4:
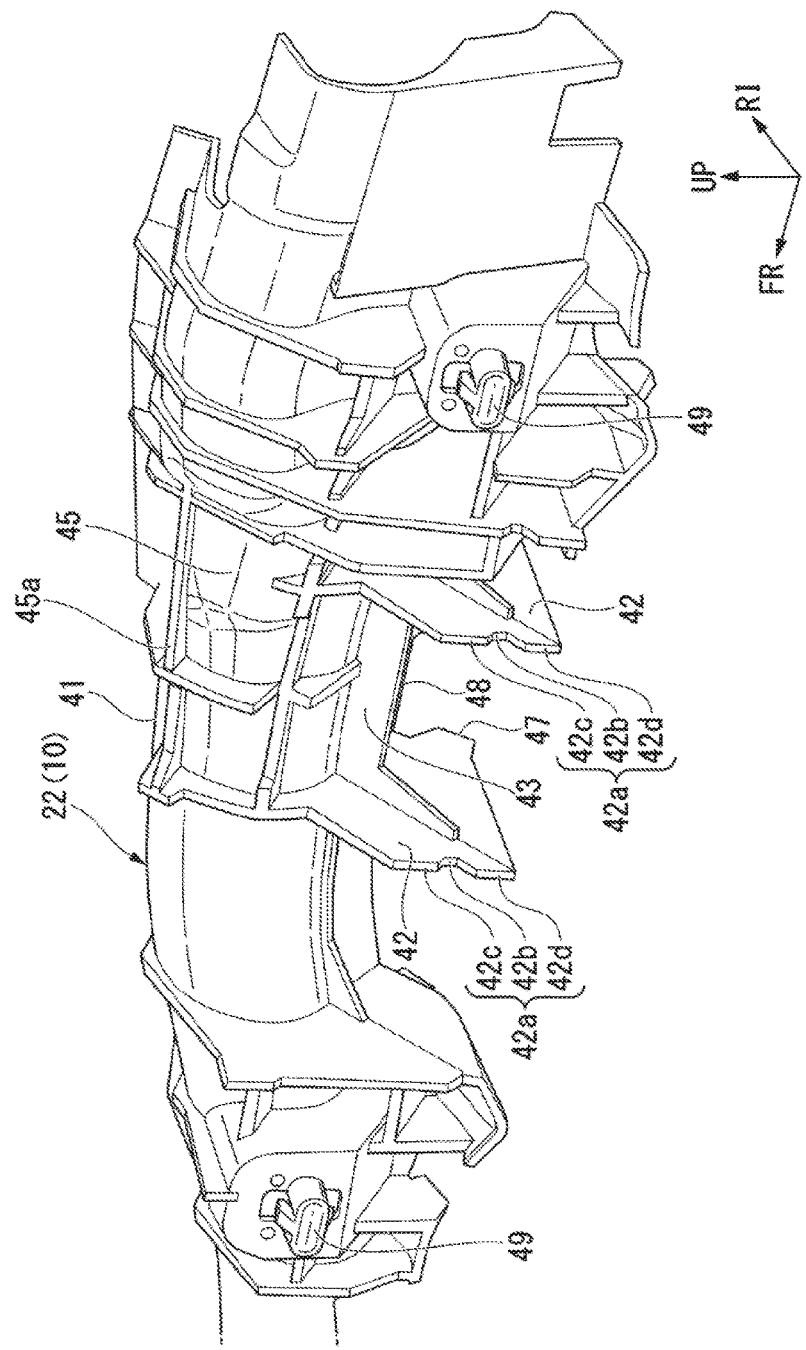
FIG. 4 is an enlarged perspective view of a protector as seen from the vehicle exterior.
Figure 5:
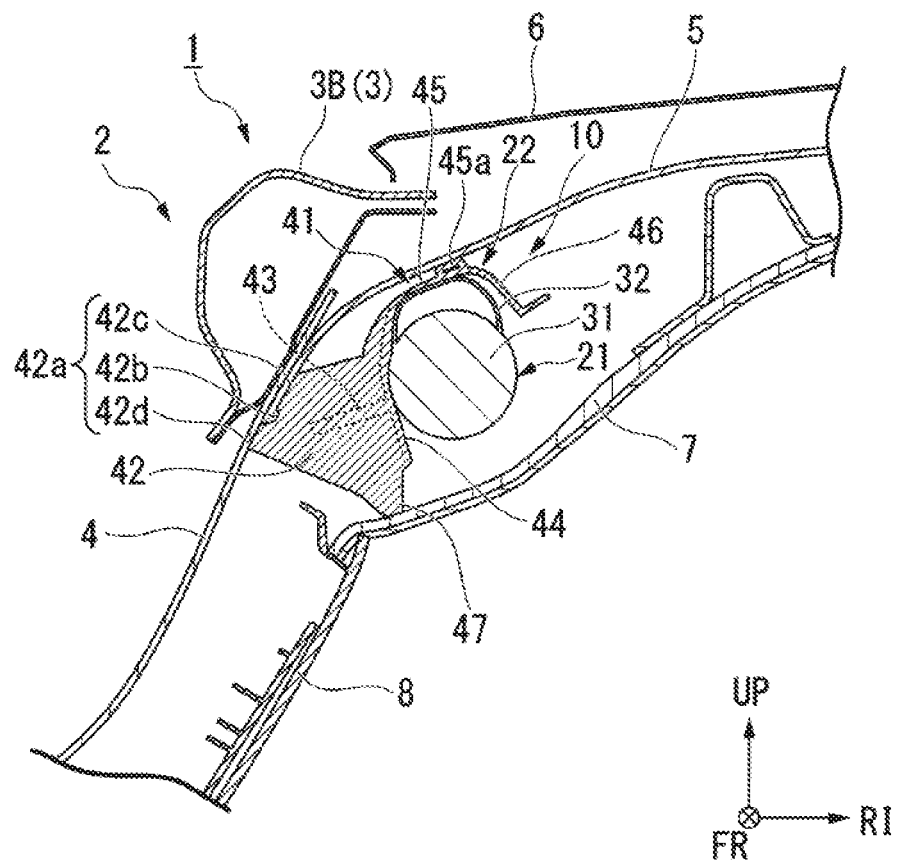
FIG. 5 is an explanatory view of the vehicle, and is a sectional view of a portion of FIG. 3 taken along the line V-V thereof.

FIG. 3 is a perspective view of the airbag system as seen from the vehicle exterior. FIG. 4 is an enlarged perspective view of the protector as seen from the vehicle exterior. FIG. 5 is an explanatory view of the vehicle, and is a sectional view of a portion of FIG. 3 taken along the line V-V thereof.

As illustrated in FIGS. 3 and 5, the protector 22 is interposed between a set of the vehicle body 2 (e.g., the roof side part 3, the center pillar 4, and the roof arch 5) and the roof panel 6 and the body 21. The protector 22 has an inside surface generally facing the vehicle interior side and configured to hold thereon the airbag body 21 and guide the deployment of the airbag body 21 and has a back surface generally facing the vehicle exterior side. The protector 22 includes: a main body part 41 that extends along the roof side part 3 and covers the airbag body 21 with the inside surface; a pair of first ribs 42 that each protrude from the back surface and extend toward the vehicle exterior from the main body part 41; and a second rib 43 that protrudes from the back surface and extends in generally a lateral direction that bridges and connects the paired, first ribs 42 to each other. Note that, in the following description, description is given of the configuration of a portion of the protector 22 at and near a position where the first ribs 42 and the second rib 43 are arranged.

As illustrated in FIG. 5, the main body part 41 is formed in U-shape as seen in transverse section, and covers the airbag body 21 from the vehicle exterior and opens toward the vehicle interior. In the transverse sectional view, the main body part 41 has: a lower guide part 44 that linearly extends outward and upward in the vehicle widthwise direction from a bottom edge of the opening; an upper covering part 45 that extends upward from an upper end part of the lower guide part. 44 and then extends inward and upward in the vehicle widthwise direction; and an upper guide part 46 that extends inward and downward in the vehicle widthwise direction from an inner end part of the upper covering part 45 in the vehicle widthwise direction. The lower guide part 44 protrudes toward the vehicle interior further than the upper guide part 46. A vehicle interior-side end part of the lower guide part 44 is away from the roof lining 7. An upper rib 45a that protrudes upward and is in contact with the vehicle body 2 (roof arch 5) is formed on the upper-covering part 45.

As illustrated in FIG. 4, the pair of first ribs 42 is placed at a position corresponding to an occupant's seating position, such as a position ahead of the headrests of a driver's seat and a passenger's seat (not illustrated) in the front-rear direction. In addition, the pair of first ribs 42 is placed at substantially the same position as a connection part between the deployment part 31 of the airbag body 21 and the gas introduction route 32 in the direction in which the main body part 41 extends (see FIG. 1). The paired first ribs 42 are arranged side by side in the direction in which the main body part 41 extends, while the ridge of each rib 42 extends generally in a direction vertical and along the vehicle-width direction. The paired first ribs 42 each have a tabular shape, and are arranged so that their principal faces are directed in the direction in which the main body part 41 extends. As illustrated in FIGS. 4 and 5, each of the first ribs 42 extends toward the vehicle exterior from the whole of the lower guide part 44 of the main body part 41 as seen in the direction in which the main body part 41 extends. Each of the first ribs 42 has, at its lower end part, a protruding part 47 that protrudes toward the roof lining 7. The protruding part 47 is in contact with the roof lining 7.

As illustrated in FIG. 5, an outer side edge 42a of the first rib 42 in the vehicle widthwise direction extends along a face of the body 2 directed toward the vehicle interior, and is in contact with the body 2. Specifically, the side edge 42a of the first rib 42 is disposed near a joint between the center pillar 4 and the roof arch 5. The side edge 42a of the first rib 42 is in contact with the center pillar 4 and the roof arch 5, and is opposed to the roof side rail 35 with the center pillar 4 and the roof arch 5 interposed therebetween. The side edge 42a of the first rib 42 is formed to have a shape including: an avoidance part 42b that is notched (cutout) to avoid a step formed by the overlap between the center pillar 4 and the roof arch 5; an upper straight part 42c that is placed above the avoidance part 42b and in contact with the roof arch 5; and a lower straight part 42d that is placed below the avoidance part 42b and in contact with the center pillar 4.

Figure 6:
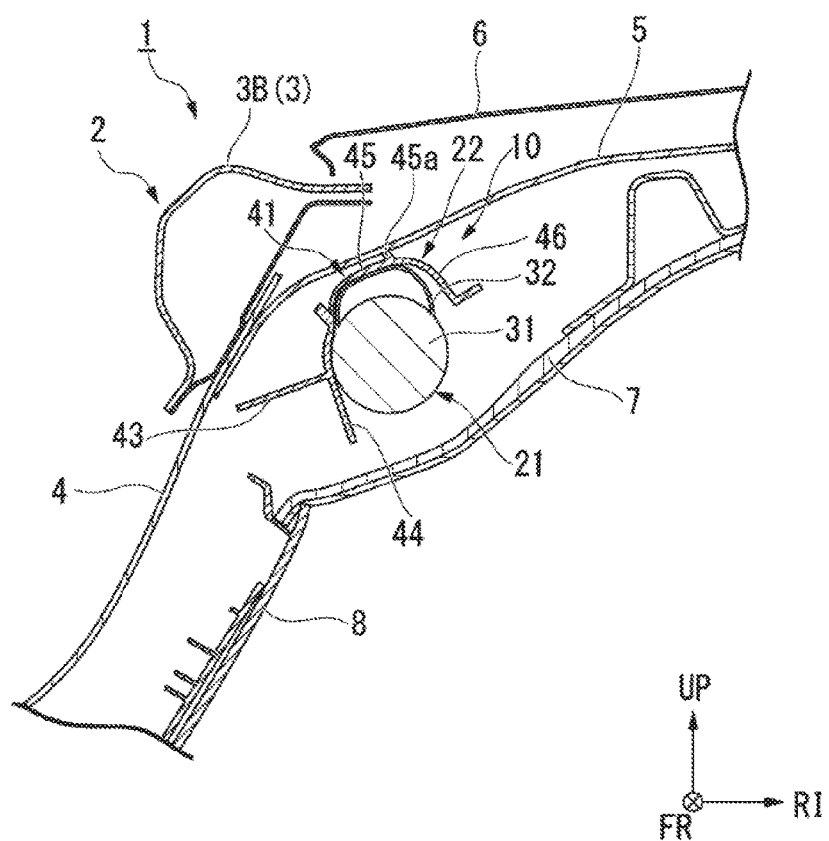
FIG. 6 is an explanatory view of the vehicle, and is a sectional view of a portion of FIG. 3 taken along the line VI-VI thereof.

FIG. 6 is an explanatory view of the vehicle, and is a sectional view of a portion of FIG. 3 taken along the line VI-VI thereof.

As illustrated in FIGS. 3 and 6, the second rib 43 has a tabular shape. The second rib 43 extends in the direction in which the main body part 41 extends so as to connect the paired first ribs 42 to each other. The second rib 43 extends toward the vehicle exterior and obliquely downward from the lower guide part 44 of the main body part 41, while the ridge of the rib 43 extends generally in the longitudinal direction in which the main body part 41 extends, bridging the first ribs 42. In other words, the second rib 43 is disposed so that its one principal face is directed toward the vehicle interior. The second rib 43 extends from a portion of the lower guide part 44, located at a position closer to the vehicle exterior than the vehicle interior-side end part of the lower guide part 44 (a portion located above a lower end part of the lower guide part), toward a position of the first rib 42 located farthest from the main body part 41 (the lower end of the side edge 42a in this embodiment). In other words, the second rib 43 is placed at a position closer to the vehicle exterior than a vehicle interior-side end part of the first rib 42. Note that, although in this embodiment the second rib 43 extends to a position closer to the main body part 41 than the lower end of the side edge 42a, the second rib may extend to the lower end of the side edge 42a.

As illustrated in FIG. 3, the second rib 43 has a notch (cutout) part 48 formed by notching a vehicle exterior-side portion (tip part) of the second rib toward its proximal end. The notch part 48 is formed at the center of the second rib 43 in the direction in which the main body part 41 extends. The notch part 48 is formed in a trapezoidal shape whose dimension in the direction in which the main body part 41 extends becomes gradually smaller from the tip of the second rib 43 toward its proximal end. The notch part 48 has a dimension larger than half of that from the tip to the proximal end of the second rib 43.

The protector 22 having the above configuration includes clips 49 at positions ahead of and behind the pair of first ribs 42, respectively. Each of the clips 49 is disposed to protrude from the main body part 41 toward the vehicle exterior, and is locked on the roof side rail 3B (see FIG. 1).

Moreover, the protector 22 is provided with a binding tape 27 that binds the protector 22 and the airbag body 21 together. The binding tape 27 is made of fabric, for example. The binding tape 27 is wound around the protector 22 and the airbag body 21, and two or more such binding tapes are arranged with a clearance in between in the direction in which the main body part 41 extends. Thereby, the airbag body 21 is held in a folded state in the protector 22. The protector 22 holds the airbag body 21 with both front and rear end parts of the airbag body 21 protruding therefrom.

In this manner, according to this embodiment, since the paired first ribs 42 adjacent to each other are connected by the second rib 43, the rigidity of the first ribs 42 can be increased. This inhibits the first ribs 42 from being elastically deformed and allows the first ribs 42 to stay in contact with the vehicle body 2 at the time of deployment of the airbag body 21, thus making it possible to inhibit the main body part 41 (lower guide part 44) of the protector 22 covering the airbag body 21 from being deformed toward the vehicle exterior cue to the deployment pressure of the airbag body 21. Thereby, the deployment direction of the airbag body 21 can be stabilized.

In addition, the second rib 43 extends toward the vehicle e tenor and obliquely downward from the main body part 41 mounted on the roof side part 3. Thus, when an occupant makes contact with the protector 22 from the vehicle interior and below, the second rib 43 is applied with a load in a direction normal to the principal face of the second rib. Thereby, the second rib 43 can be bent easily. Moreover, since the first ribs 42 are also applied with the load in the direction normal to the principal face of the second rib 43, the first ribs 42 are not supported by the second rib 43 and thus can be deformed easily. Thereby, an impact applied when an occupant makes contact with the protector 22 can be absorbed.

These enable the stabilization of the deployment direction of the airbag body 21 and the protection of an occupant at the same time.

Further, the second rib 43 has the notch part 48 that is located at the center of the second rib in the direction in which the main body part 41 extends, i.e., in the direction in which the paired first ribs 42 are arranged, and formed by notching the vehicle exterior-side portion of the second rib. This implements a structure which enables the second rib 43 to be easily bent with the help of the notch part 48 while achieving an increase of the rigidity of the first ribs 42 with the help of the second rib 43. This enables the stabilization of the deployment direction of the airbag body 21 and the protection of an occupant at the same time.

Furthermore, the second rib 43 is placed at a position corresponding to the occupant's seating position. This makes it possible to inhibit the main body part 41 from being deformed at the occupant's seating position and deploy the airbag body 21 in a desired direction.

In addition, since the second rib 43 is placed at a position closer to the vehicle exterior than the vehicle interior-side end part of each of the first ribs 42, a connection part between the first rib 42 and the second rib 43 is placed at a position closer to the vehicle exterior than the vehicle interior-side end part of the first rib 42. This makes it possible to deform the whole of the first rib 42 around the connection part between itself and the second rib 43 when an occupant makes contact with the vehicle interior-side end part of the first rib 42. Thereby, an impact applied when an occupant makes contact with the protector 22 cart be absorbed by the whole of the first rib 42.

Further, each of the first ribs 42 has the protruding part 47 that protrudes toward the roof lining 7 so as to be capable of making contact with the roof lining. Thus, the roof lining 7 comes into contact with the protruding part 47 when it moves toward the airbag system 10, whereby misalignment of the roof lining 7 can be prevented easily.

Furthermore, the side edge 42a of each of the first ribs 42 has the avoidance part 42h that is notched to avoid the step formed by the overlap between the center pillar 4 and the roof arch 5. This makes it possible to prevent the first rib 42 from running onto the step and prevents deformation of the main body part 41, thereby enabling the stabilization of the deployment direction of the airbag body 21.

In addition, the vehicle interior-side end part of the lower guide part 44 of the main body part 41 is away from the roof lining 7. This makes it possible to prevent a situation where the lower guide part 44 of the main body part 41 gets caught on the roof lining 7 and thus the main body part 41 is deformed, thereby enabling the stabilization of the deployment direction of the airbag body 21.

Note that the present invention is not limited to the above embodiment having been described with reference to the drawings, and various modification examples are conceivable within the technical scope of the present invention.

For example, although the pair of first ribs 42 is placed at a position corresponding to the occupant's seating position in the above embodiment, the present invention is not limited to this, and the first ribs may be placed at any position. Moreover, although the pair of first ribs 42 is in contact with the center pillar 4 and the roof arch 5 in the above embodiment, the present invention is not limited to this, and the first ribs may be directly in contact with the roof side rail 3B instead.

In addition, although the pair of first ribs 42 is provided in the above embodiment, the present invention is not limited to this, and three or more first ribs may be provided instead. This case also brings about the above operation and effect as long as there is at least one second rib connecting the adjacent pair of first ribs to each other.

The shape and installation position of the inflator may be changed, and the constituents of the above embodiment may be replaced with known constituents as appropriate without departing from the gist of the present invention.

DESCRIPTION OF REFERENCE NUMERALS

2 BODY
3 ROOF SIDE PART (VEHICLE BODY)
4 CENTER PILLAR (VEHICLE BODY)
5 ROOF ARCH (VEHICLE BODY)
7 ROOF LINING (INTERIOR LINING MEMBER)
10 AIRBAG SYSTEM (SIDE CURTAIN AIRBAG SYSTEM)
21 AIRBAG BODY
22 PROTECTOR
41 MAIN BODY PART
42 FIRST RIB
43 SECOND RIB
47 PROTRUDING PART
48 NOTCH PART

The invention claimed is:

1. A side curtain airbag system comprising:
an airbag body mounted on a vehicle interior side of a roof side part of a vehicle body and configured to deploy upon supply of gas; and
a protector configured to hold said airbag body and guide deployment of said airbag body,
wherein said protector comprises:
a main body part that extends along said roof side part in a longitudinal direction of the main body part and covers said airbag body;
a plurality of first ribs each protruding from said main body part, extending toward a vehicle exterior side, and configured to make contact with said vehicle body when said airbag body is deployed, said first ribs being arranged in the longitudinal direction in which said main body part extends; and
a second rib provided between an adjacent pair of said first ribs such that the second rib connects the adjacent pair of said first ribs to each other, the second rib protruding from the said main body part and extending toward said vehicle exterior and obliquely downward from said main body part, wherein
said second rib has a cutout part at the center of said second rib in the longitudinal direction in which said main body part extends, the cutout part having been formed by cutting out a vehicle exterior-side portion of said second rib, the cutout part being formed in a trapezoidal shape whose short parallel side extends in the longitudinal direction at a side of a proximal end of said second rib.

2. The side curtain airbag system according to claim 1, wherein said second rib is placed at a position corresponding to an occupant's seating position.

3. The side curtain airbag system according to claim 1, wherein said second rib is placed at a position closer to said vehicle exterior than a vehicle interior-side end part of each of said first ribs.

4. The side curtain airbag system according to claim 1, further comprising an interior lining member that covers the airbag body,
   wherein each of said first ribs has a protruding part that protrudes toward said interior lining member so as to be capable of making contact with said interior lining member.

* * * * *